US012129957B1

(12) United States Patent
Bonev

(10) Patent No.: US 12,129,957 B1
(45) Date of Patent: Oct. 29, 2024

(54) DISPLAY MOUNTING SYSTEM WITH CONCEALED LIFTING MECHANISM FOR ENHANCED USER VIEWING COMFORT AND AESTHETICS

(71) Applicant: Jordan Stoyanov Bonev, Haworth, NJ (US)

(72) Inventor: Jordan Stoyanov Bonev, Haworth, NJ (US)

( * ) Notice: Subject to any disclaimer, the term of this patent is extended or adjusted under 35 U.S.C. 154(b) by 0 days.

(21) Appl. No.: 18/735,268

(22) Filed: Jun. 6, 2024

(51) Int. Cl.
*F16M 11/04* (2006.01)
*F16M 11/18* (2006.01)
*F16M 13/02* (2006.01)

(52) U.S. Cl.
CPC ........... *F16M 11/046* (2013.01); *F16M 11/18* (2013.01); *F16M 13/02* (2013.01)

(58) Field of Classification Search
CPC ....... F16M 11/046; F16M 11/18; F16M 13/02
USPC ............................................... 248/125.2, 917
See application file for complete search history.

(56) References Cited

U.S. PATENT DOCUMENTS

| | | | |
|---|---|---|---|
| 11,449,093 B2 * | 9/2022 | Hobbs | G06F 1/18 |
| 11,779,115 B2 * | 10/2023 | Pei | F16M 11/08 |
| | | | 248/277.1 |
| 11,849,846 B1 * | 12/2023 | Hewatt | A47B 96/067 |
| 2006/0250347 A1 * | 11/2006 | Bertoncini | G06F 1/1601 |
| | | | 345/103 |
| 2009/0194655 A1 * | 8/2009 | Huang | F16M 11/10 |
| | | | 248/282.1 |
| 2010/0012799 A1 * | 1/2010 | Sexton | F16M 11/10 |
| | | | 248/225.21 |
| 2011/0174944 A1 * | 7/2011 | Fredette | F16M 13/02 |
| | | | 248/220.22 |
| 2021/0332938 A1 * | 10/2021 | Gilligan | F16M 11/2064 |
| 2023/0120537 A1 * | 4/2023 | Watanabe | F16M 11/22 |
| | | | 361/679.21 |

* cited by examiner

*Primary Examiner* — Todd M Epps
(74) *Attorney, Agent, or Firm* — Novel Patent Services

(57) ABSTRACT

The present invention relates to a display mounting system with a lifting mechanism for vertically adjusting the position of the display and maintaining a visually unobtrusive appearance by concealing the lifting mechanism behind the display itself. The display mounting system comprises a mounting frame, a pair of moving rails, a plurality of supporting members, at least one hoist, at least one line system, at least one driving unit, and a control unit. The display mounting system accommodates larger and heavier displays beyond the capabilities of existing solutions. The display mounting system offers greater flexibility in adjusting the display height for optimal viewing comfort. The display mounting system integrates seamlessly with the surrounding environment without detracting from the overall design.

20 Claims, 9 Drawing Sheets

DISPLAY MOUNTING SYSTEM WITH CONCEALED LIFTING MECHANISM FOR ENHANCED USER VIEWING COMFORT AND AESTHETICS

FIELD OF THE INVENTION

The present disclosure relates generally to display mounting systems, and more particularly to a display mounting system with a lifting mechanism for vertically adjusting the position of the display and maintaining a visually unobtrusive appearance by concealing the lifting mechanism behind the display itself.

BACKGROUND

Televisions (TVs) have become an indispensable element of modern living spaces, seamlessly integrating into the very fabric of our homes. They serve as the focal point of entertainment, information access, and even communication, shaping the way we interact with technology and consume media. This ubiquitous presence has redefined the design and functionality of living spaces, with homeowners and interior designers increasingly prioritizing the seamless integration of television displays into the overall aesthetic.

However, traditional television mounts often fall short of providing optimal viewing experiences due to their limited functionality. While these mounts typically allow for tilting the screen left and right, they lack the crucial feature of vertical screen height adjustment. This significantly restricts the range of comfortable viewing positions, particularly for users seated at different distances or heights from the display. For instance, individuals positioned low on sofas or recliners may find the screen uncomfortably high, which leads to neck strain and fatigue. Conversely, users standing or seated higher up may experience an unnaturally low viewing angle, which potentially causes eye strain and discomfort.

Recognizing this limitation, a MantelMount system emerged as a solution, which offers vertical screen adjustment through a motorized mechanism. While this advancement represents a step forward in terms of viewing comfort, the MantelMount solution also suffers from significant drawbacks that hinder its widespread adoption. The primary limitation lies in the bulky and visually unappealing wall-mounted bracket. This prominent bracket remains visible even when the TV is lowered to eye level, creating an unsightly and intrusive presence that detracts significantly from the overall aesthetics of the room. This visual clutter disrupts the clean lines and harmonious design of modern living spaces, thereby diminishing the intended viewing experience.

Furthermore, the MantelMount system has limitations in terms of weight capacity and travel range. Primarily designed for TVs up to 90 inches, it may not be suitable for larger and heavier displays that are becoming increasingly popular. Additionally, the 26-inch vertical travel range offered by the MantelMount system might not be sufficient for users seeking a wider range of adjustment. This limited range restricts the ability to achieve optimal viewing positions for individuals with varying heights or viewing preferences, thereby potentially compromising the overall comfort and enjoyment of the viewing experience.

FIG. 1A refers to a schematic view of a prior art depicting a floor-mounted display stand 10. Traditional floor-mounted display stands 10 can be aesthetically unappealing and occupy valuable floor space that could be used for other purposes. This is a major drawback for users who prioritize clean, modern aesthetics and efficient space utilization in their environment.

FIG. 1B refers to a schematic view of a prior art depicting a ceiling-mounted display stand 12. While ceiling-mounted display stands 12 offer some flexibility, they can introduce visual clutter, especially if the cables are exposed. This can be a significant concern for users who value a clean and minimalist aesthetic in their space.

FIG. 1C refers to a schematic view of a prior art depicting a dual floor-and-ceiling mounted display stand 14. These display mounting systems fixed to both the floor and ceiling create a visually cluttered and bulky appearance. The additional support structures on both the floor and ceiling overwhelm the space and detract from the overall aesthetics of the room. This approach is inefficient and clashes with modern design principles that favour clean lines and minimalism.

FIG. 1D refers to a schematic view of a prior art depicting a wall-mounted display 16. Existing wall-mounted displays 16 may have exposed mounting hardware that becomes visually intrusive when the display unit is raised or lowered. This disrupts the clean lines of the display itself and can be aesthetically displeasing, especially for users who value for a modern and integrated look.

By addressing all the above mentioned limitations, there is a need for a display mounting system with a lifting mechanism for vertically adjusting the position of the display and maintaining a visually unobtrusive appearance by concealing the lifting mechanism behind the display itself. There is also a need for a display mounting system that accommodates larger and heavier displays beyond the capabilities of existing solutions. There is also a need for a display mounting system that offers greater flexibility in adjusting the display height for optimal viewing comfort. Further, there is also a need for a display mounting system that integrates seamlessly with the surrounding environment without detracting from the overall design.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a display mounting system with a lifting mechanism for vertically adjusting the position of the display and maintaining a visually unobtrusive appearance by concealing the lifting mechanism behind the display itself. The display mounting system accommodates larger and heavier displays beyond the capabilities of existing solutions. The display mounting system offers greater flexibility in adjusting the display height for optimal viewing comfort. In one embodiment herein, the display mounting system comprises a mounting frame, a pair of moving rails, a plurality of supporting members, at least one hoist, and a control unit.

In one embodiment herein, the mounting frame is adapted to be secured to a surface. The pair of moving rails movably supports a display unit. The pair of moving rails is configured to enable vertical movements of the display unit.

In one embodiment herein, the plurality of supporting members is adapted to be mounted on the mounting frame. The plurality of supporting members is configured to engage with the pair of moving rails through one or more rollers to facilitate smooth and uniform vertical motion of the display unit.

In one embodiment herein, the mounting frame, the pair of moving rails, and the plurality of supporting members are made of at least one of a material including high-strength steel, aluminum, and reinforced plastic.

In one embodiment herein, at least one hoist is operably connected to at least one driving unit. The at least one hoist is configured to be rotated upon activation of the at least one driving unit to raise and lower the pair of moving rails through a line system, thereby lowering and raising positions of the display unit. The at least one hoist comprises at least one of a winch, a pulley, and a cable drum.

In one embodiment herein, the control unit is electrically connected to the at least one driving unit. The control unit comprises a processor and a memory for storing one or more instructions executable by the processor. In one embodiment herein, the processor is configured to perform one or more operations of the display mounting system.

In one embodiment herein, the display mounting system further comprises a brake system that is operably connected to the at least one driving unit. The brake system is configured to control the at least one driving unit, thereby facilitating adjustment of the lowering and raising positions of the display unit.

In one embodiment herein, the display mounting system further comprises a remote control unit that is in wireless communication with the control unit via a network. The remote control unit is configured to facilitate users to remotely control the display mounting system for adjusting positions of the display unit.

In one embodiment herein, the display mounting system further comprises a reducer that is operably connected between the at least one driving unit and the at least one hoist for adjusting speed and torque of the at least one driving unit.

In one embodiment herein, the display mounting system further comprises a deactivation unit that is in communication with the control unit and is configured to deactivate the at least one driving unit when the pair of moving rails reaches its maximum raising and lowering positions. In one embodiment herein, the deactivation unit comprises at least one of control switches and position sensors.

In one embodiment herein, the display mounting system further comprises a vertical guide tensioner that is operably connected to the line system for adjusting tension and ensuring smooth movement of the pair of moving rails.

In one embodiment herein, a method is disclosed for operating the display mounting system. First, at one step, the mounting frame of the display mounting system is secured to the surface. At another step, the user activates the display mounting system through the control unit. At another step, the control unit controls the at least one driving unit to enable precise control of the pair of moving rails that securely supports a display unit. At another step, the control unit actuates the at one hoist that is operably connected to at least one driving unit, thereby raising and lowering positions of the display unit through the pair of moving rails using the line system.

Further, at another step, the user controls the brake system of the at least one driving unit to facilitate remotely adjustment of the lowering and raising positions of the display unit using the remote control unit through the control unit of the display mounting system, thereby securing the display unit at a desired position, resulting in enhanced user viewing comfort and aesthetic appeal.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
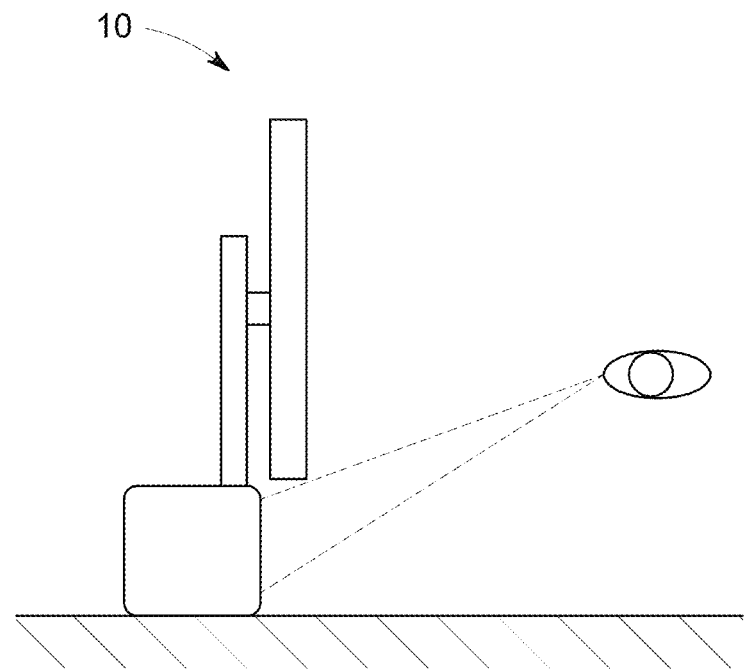
FIG. 1A illustrates a schematic view of a prior art depicting a floor-mounted display stand, in accordance with a prior art embodiment to the invention.
Figure 1B:
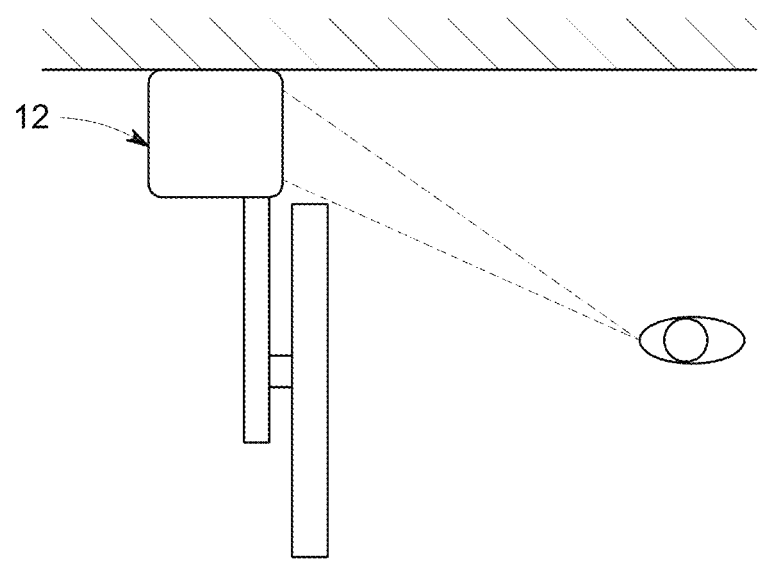
FIG. 1B illustrates a schematic view of a prior art depicting a ceiling-mounted display stand, in accordance with a prior art embodiment to the invention.
Figure 1C:
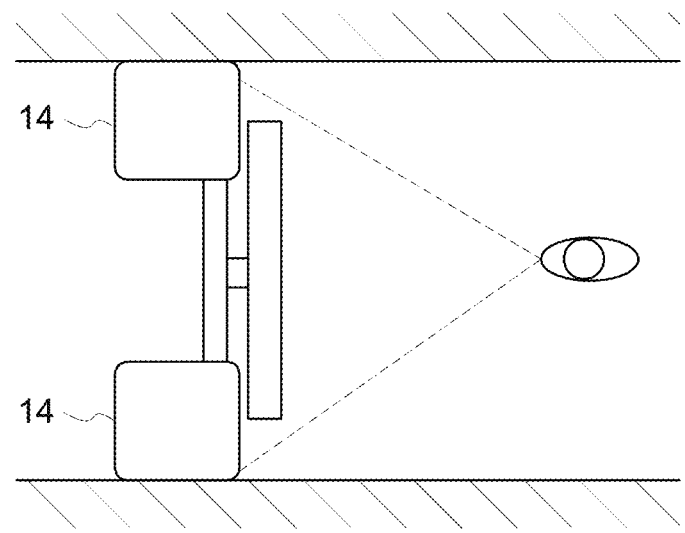
FIG. 1C illustrates a schematic view of a prior art depicting a dual floor-and-ceiling mounted display stand, in accordance with a prior art embodiment to the invention.
Figure 1D:
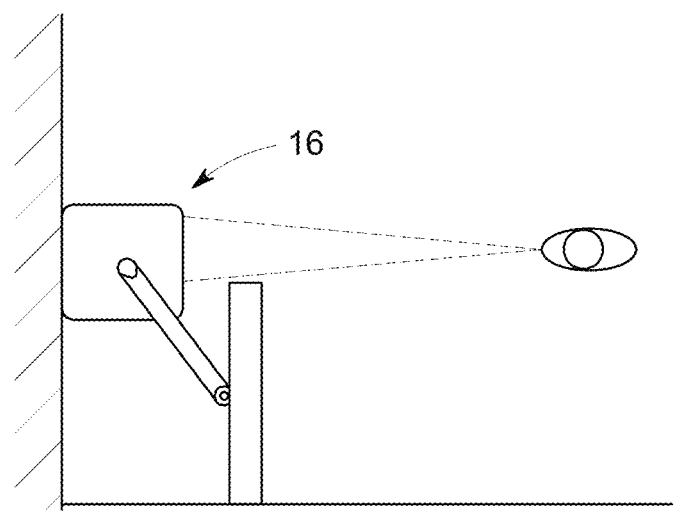
FIG. 1D illustrates a schematic view of a prior art depicting a wall-mounted display, in accordance with a prior art embodiment to the invention.

Reference will now be made in detail to the present preferred embodiments of the invention, examples of which are illustrated in the accompanying drawings. Wherever possible, the same reference numerals are used in the drawings and the description to refer to the same or like parts.

Figure 2:
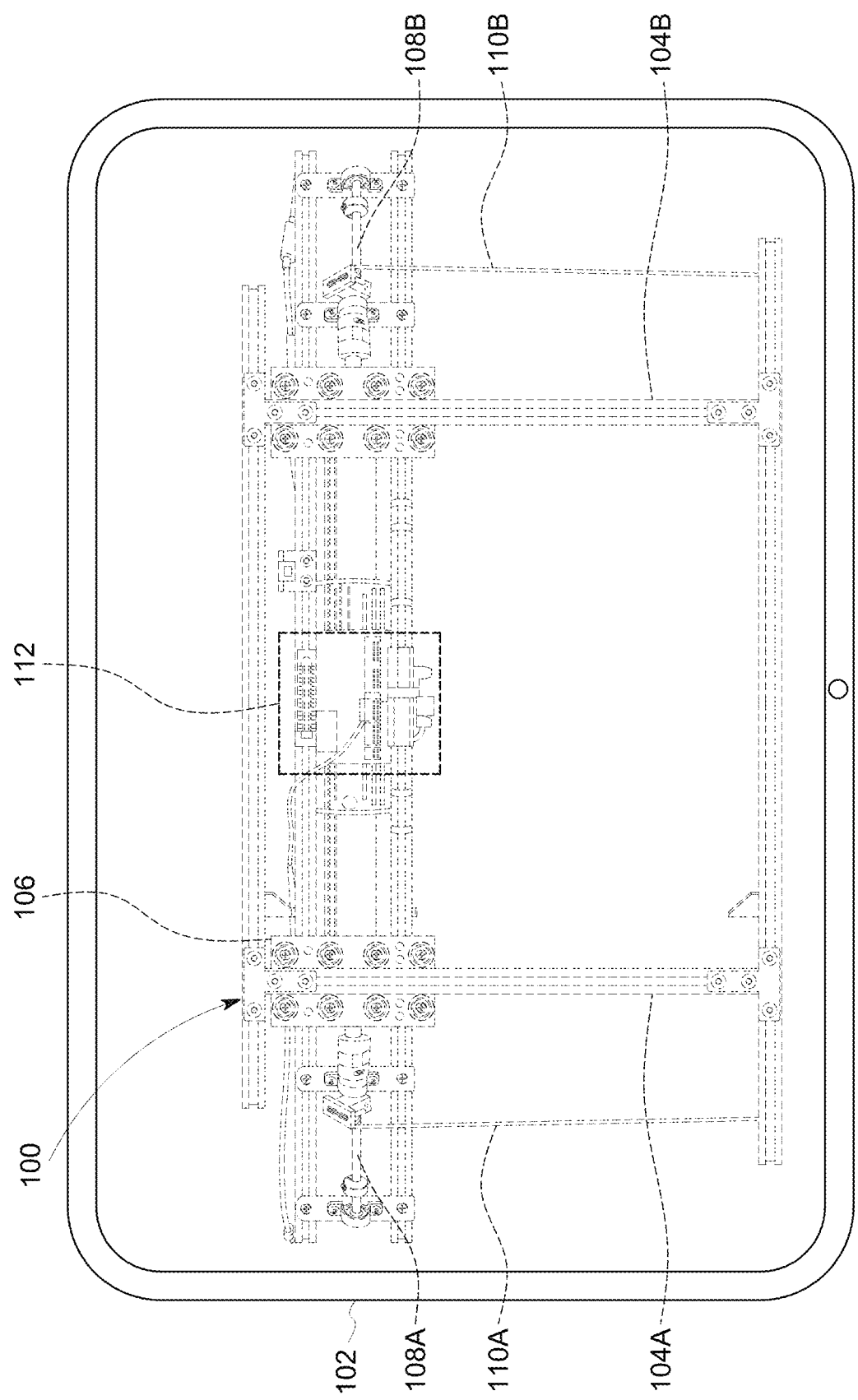
FIG. 2 illustrates a front perspective view of a display mounting system with a display unit, in accordance with embodiments of the invention.

FIG. 2 refers to a front perspective view of a display mounting system 100 with a display unit 20. In one embodiment herein, the display mounting system 100 with a lifting mechanism is disclosed for vertically adjusting the position of the display and maintaining a visually unobtrusive appearance by concealing the lifting mechanism behind the display itself. The display mounting system 100 accommodates larger and heavier displays beyond the capabilities of existing solutions. The display mounting system 100 offers greater flexibility in adjusting the display height for optimal viewing comfort. In one embodiment herein, the display mounting system 100 comprises a mounting frame 102, a pair of moving rails (104A, 104B), a plurality of supporting members 106, at least one hoist (108A, 108B), at least one line system (110A, 110B), and a control unit 112.

In one embodiment herein, the mounting frame 102 of the display mounting system 100 is capable of securely holding the display unit 20 on a wall surface. The mounting frame 102 is typically made from a rigid and durable material, such as high-strength steel, aluminum, or reinforced plastic. The material selection should consider the weight of the display unit 20 that the mounting frame 102 needs to support. The overall shape and size of the mounting frame 102 may depend on the specific display unit 20 and desired functionality. However, the mounting frame 102 generally comprises a flat or contoured rear surface for secure attachment to the wall surface and any mounting surface. In one embodiment herein, the display unit 20 can be, but not limited to, a television, a monitor, a computer display, a projector screen, and thereof.

Figure 3:
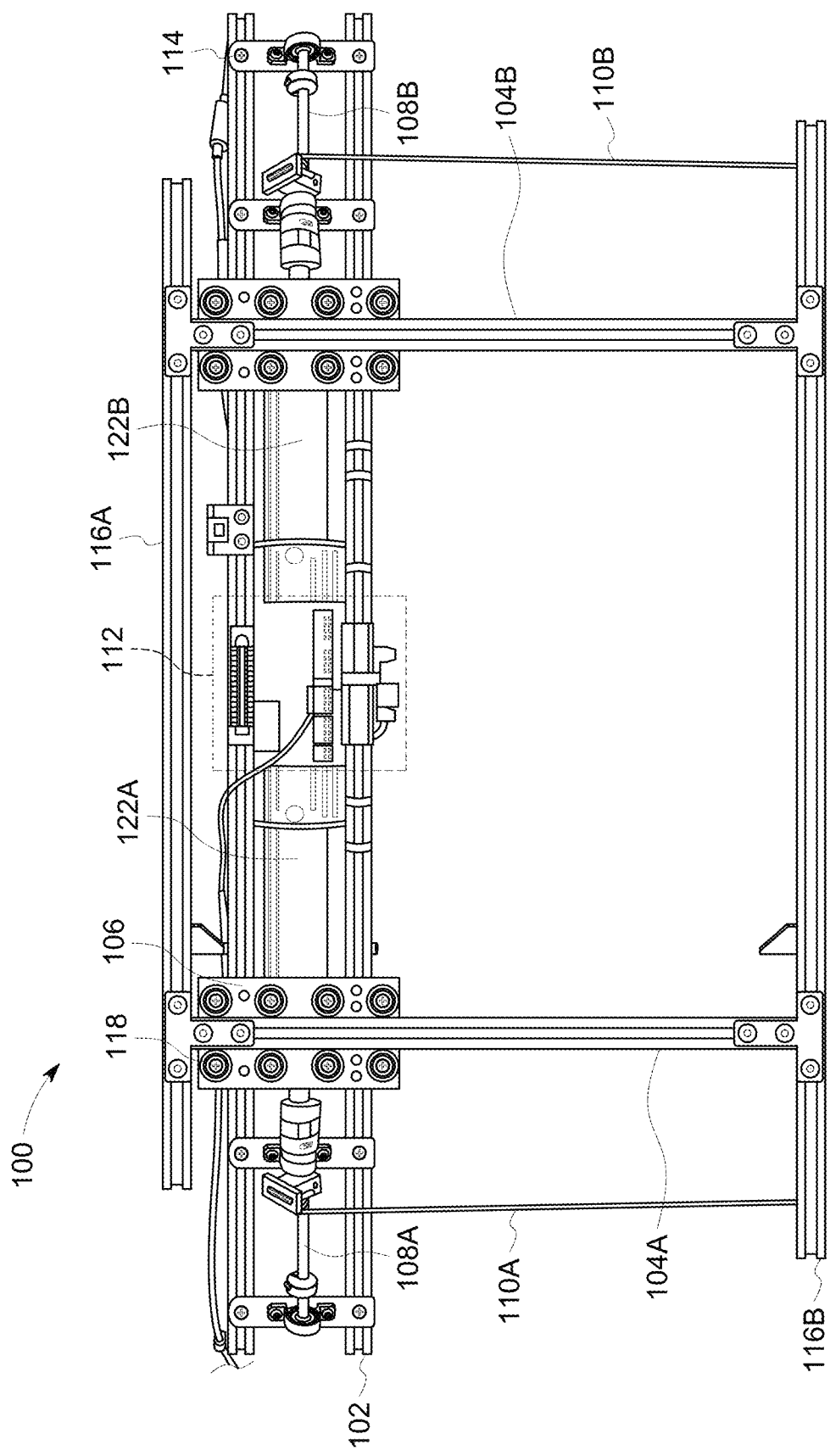
FIG. 3 illustrates a front perspective view of the display mounting system, in accordance with embodiments of the invention.

FIG. 3 refers to a front perspective view of the display mounting system 100. In one embodiment herein, the mounting frame 102 may have a plurality of pre-drilled holes positioned for easy and secure attachment to the wall surface using one or more fasteners 114. In one embodiment herein, the one or more fasteners 114 include at least one of screws, bolts, anchors, and drywall plugs. The type and size of the fasteners 114 may vary depending on the wall material. For example, some mounting frames 102 might include specific anchors or inserts suitable for different mounting surfaces present in private or public areas such as office spaces, educational institutions, and hospitality settings. The display mounting system 100 accommodates larger and heavier displays of above 90 inches with over 40 inches of vertical travel.

In one embodiment herein, the pair of moving rails (104A, 104B) is configured for vertical movement of the display unit 20. The moving rails (104A, 104B) are typically made from a strong and lightweight material, such as extruded aluminum or steel. The moving rails (104A, 104B) are parallelly connected to each other via at least two connecting members (116A, 116B). In one embodiment herein, the connecting members (116A, 116B) comprise an upper connecting member 116A and a lower connecting member 116B, which are typically made from a strong and lightweight material, such as extruded aluminum or steel.

In one embodiment herein, the moving rails (104A, 104B) are securely affixed to the rear surface of the display unit 20 using various methods. In one embodiment herein, the moving rails (104A, 104B) can be directly bolted, or riveted to the display unit 20 for a permanent and highly secure connection. In other embodiments, the moving rails (104A, 104B) and the display unit 20 are securely connected to each other using slots and brackets, which allow for easier assembly and disassembly.

Figure 4:
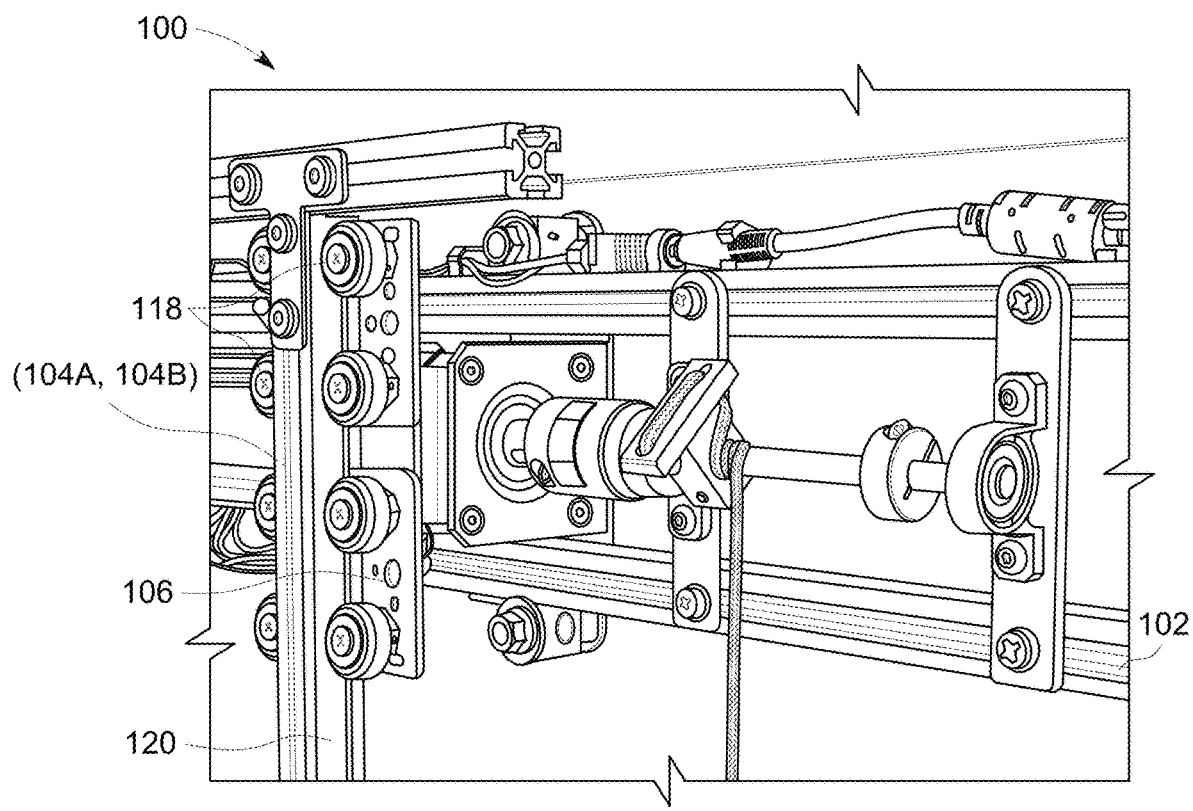
FIG. 4 illustrates a perspective view of the display mounting system depicting a plurality of supporting members mounted on a mounting frame, in accordance with embodiments of the invention.

FIG. 4 refers to a perspective view of the display mounting system 100 depicting the plurality of supporting members 106 mounted on the mounting frame 102. In one embodiment herein, the supporting members 106 are a set of fixed supports typically made from a strong and rigid material such as steel or aluminum. The supporting members 106 are securely mounted onto the mounting frame 102 using the fasteners 114 at strategic positions to ensure stability and proper alignment. Each supporting member 106 is configured to engage with the moving rails (104A, 104B) for guiding their vertical movement. In one embodiment herein, the supporting members 106 comprise one or more rollers 118, which provide a smooth and controlled track for the moving rails (104A, 104B) to slide against during vertical adjustment.

In one embodiment herein, each moving rail (104A, 104B) incorporates grooves 120 along both opposing sides to facilitate smooth engagement with the rollers 118 of the supporting members 106. These grooves 120 are specifically designed to match the dimensions and shape of the rollers 118, thereby ensuring a snug fit that minimizes friction and allows for effortless and controlled vertical movement of the display unit 20.

Figure 5:
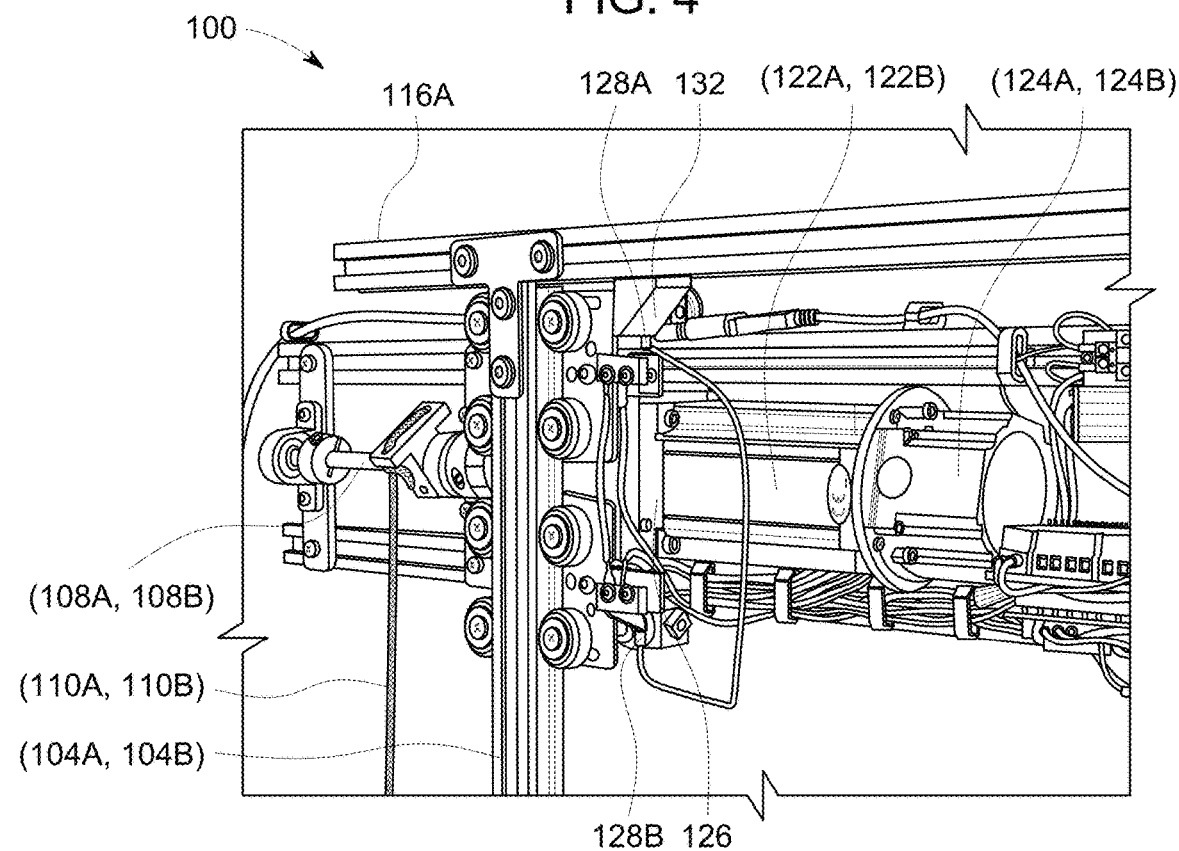
FIG. 5 illustrates a perspective view of the display mounting system depicting an upper supporting member of a pair of moving rails, in accordance with embodiments of the invention.

FIG. 5 refers to a perspective view of the display mounting system 100 depicting the upper supporting member 116A of the pair of moving rails (104A, 104B). In one embodiment herein, the at least one hoist (108A, 108B) is a mechanical device that is typically made from durable materials such as steel or aluminum to handle the weight of the display unit 20. In one embodiment herein, there are two hoists utilized in the display mounting system 100. Each hoist (108A, 108B) can be designed in various configurations, such as a pulley, a winch or a cable drum. Each hoist (108A, 108B) is rotatably connected to its respective driving unit (122A, 122B) to raise and lower the pair of moving rails (104A, 104B) through the at least one line system (110A, 110B). In one embodiment herein, the driving units (122A, 122B) can be, but not limited to, electric motors, gear motors, or other mechanisms that provide the power to rotate the hoists (108A, 108B).

In one embodiment herein, one end of each line system (110A, 110B) is securely fastened and wound around its respective hoist (108A, 108B) and other end of each line system (110A, 110B) is attached to the lower connecting member 116B of the moving rails (104A, 104B) as shown in FIG. 3. The line systems (110A, 110B) are typically made from high-strength, low-stretch materials such as steel cables or synthetic fibers. In one embodiment herein, the line systems (110A, 110B) utilized in the display mounting system 100 are typically paracords.

In one embodiment herein, each driving unit (122A, 122B) comprises a brake system (124A, 124B) configured for enhanced safety and secure positioning of the display unit 20. The specific type of brake systems (124A, 124B) used might vary depending on the design and size of the driving units (122A, 122B). In one embodiment herein, the brake systems (124A, 124B) can be, but not limited to, disc brake systems, electromagnetic brake systems and mechanical brake systems. In one embodiment herein, the display mounting system 100 comprises a reducer 126 positioned between the each driving unit (122A, 122B) and the each hoist (108A, 108B). The reducer 126 is also known as a gear reducer or speed reducer, which adjusts the speed and torque output of the each driving unit (122A, 122B).

In one embodiment herein, the display mounting system 100 comprises at least two deactivation units (128A, 128B) to ensure safe and controlled movement of the display unit 20. The deactivation units (128A, 128B) are electrical safety devices that deactivate the driving units (122A, 122B) when the moving rails (104A, 104B) reach their maximum raising and lowering positions. In one embodiment herein, the deactivation units (128A, 128B) comprise an upper deactivation unit 128A and a lower deactivation unit 128B, which are positioned on the mounting frame 102, typically near the top and bottom travel limits of the moving rails (104A, 104B). Each deactivation unit (128A, 128B) is activated when a tab 132 of the each moving rail (104A, 104B) comes into contact with it. In one embodiment herein, the deactivation units (128A, 128B) comprises at least one of control switches and position sensors.

In an exemplary embodiment, the position sensors can be used for deactivating the driving units (122A, 122B) by detecting the maximum raising and lowering positions of the moving rails (104A, 104B). These sensors may be positioned near the top and bottom travel limits of the moving rails (104A, 104B).

Figure 6:
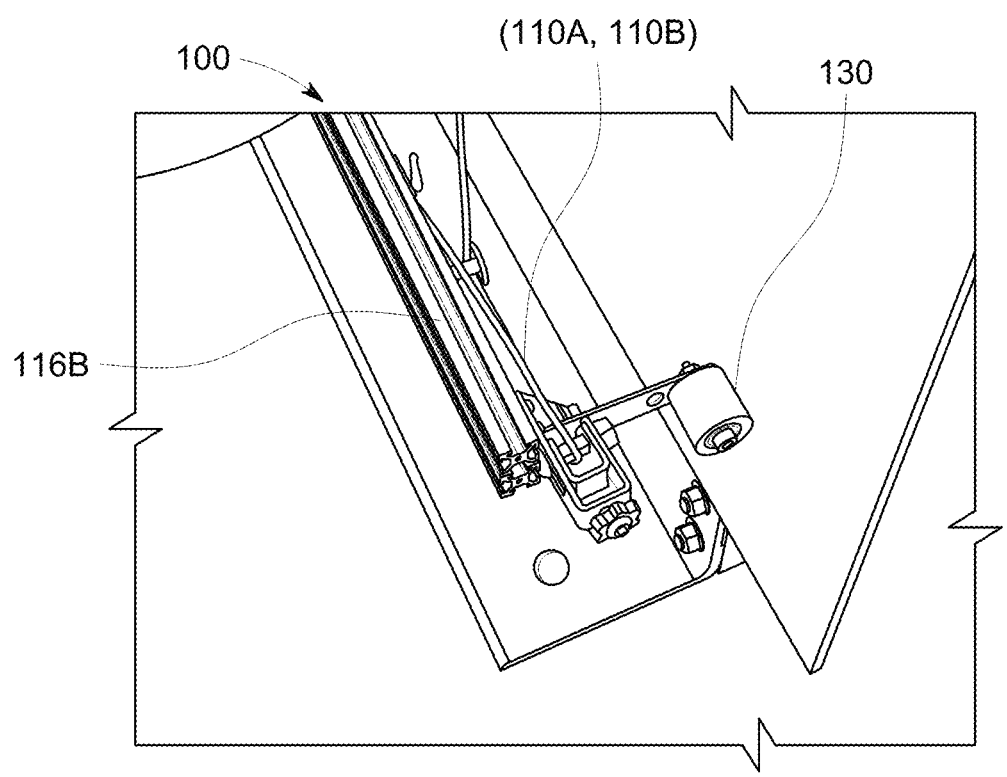
FIG. 6 illustrates a perspective view of the display mounting system depicting a lower supporting member of the pair of moving rails, in accordance with embodiments of the invention.

FIG. 6 refers to a perspective view of the display mounting system 100 depicting the lower supporting member 116B of the moving rails (104A, 104B). In one embodiment herein, the display mounting system 100 comprises a vertical guide tensioner 130, which is operably connected to the each line system (110A, 110B) to ensure smooth and stable movement of the moving rails (104A, 104B). The vertical guide tensioner 130 maintains optimal tension on the each line system (110A, 110B), which is essential for proper functionality and user experience.

Figure 7:
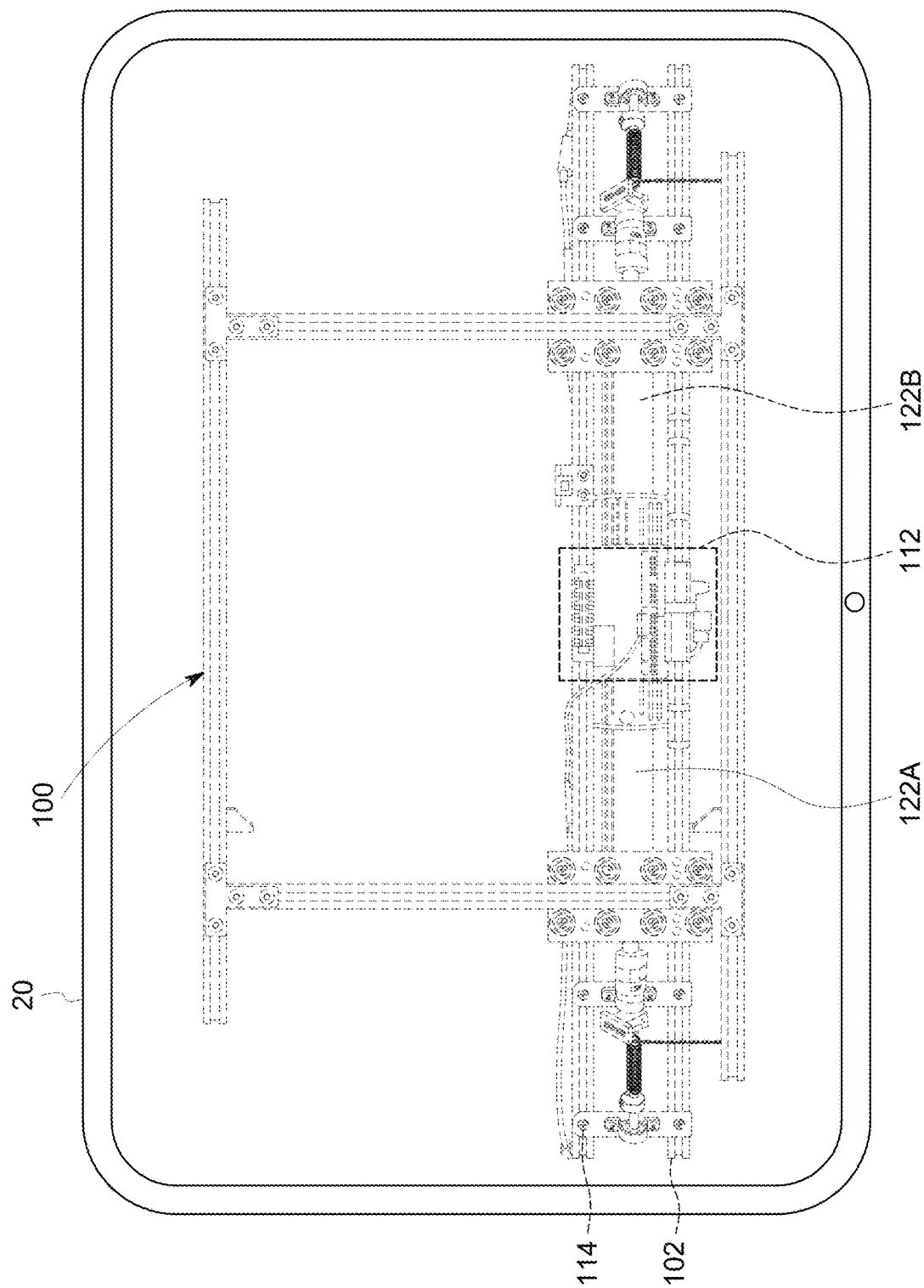
FIG. 7 illustrates a front perspective view of the display mounting system with the display unit in a raised position, in accordance with embodiments of the invention.

FIG. 7 refers to a front perspective view of the display mounting system 100 with the display unit 20 in the raised position. In one embodiment herein, the control unit 112 is configured for managing the raising and lowering of the display unit 20. The control unit 112 electronically communicates and controls the operation of the driving units (122A, 122B). The control unit 112 comprises one or more electronic components such as a processor and a memory to store multiple instructions executed by the processor. The control unit 112 requires a power source such as an AC power adapter or a battery to operate. The control unit 112 might comprise a built-in user interface such as buttons or a touch screen for users to initiate the raising and lowering of the display unit 20 and potentially adjust settings. Alternatively, the user interface could be a separate remote control unit that is in wirelessly communication with the control unit 112 via a network for controlling the display unit's vertical movement. In one embodiment herein, the network can be, but not limited to, Bluetooth, and Wi-Fi.

Referring to FIGS. 1-7, the mounting frame 102 is securely attached to the wall surface using the fasteners 114 at strategic positions to ensure stability and proper alignment, thereby creating a secure foundation for the display mounting system 100 and the display unit 20 it supports. The user initiates the adjustment of the display unit 20 either by pressing the button or through the remote control unit. The control unit 112 receives the user input signal and transmits corresponding commands to the driving units (122A, 122B). The control unit 112 activates the driving units (122A, 122B) to rotate depending on the user's required vertical direction of the display unit 20.

For example, if the user requires the display unit 20 to be raised as shown in FIG. 2, the control unit 112 enables the driving units (122A, 122B) to rotate in a clockwise direction. And if the user requires the display unit 20 to be lowered as shown in FIG. 7, the control unit 112 enables the driving units (122A, 122B) to rotate in an anti-clockwise direction. The rotation of the driving units (122A, 122B) is transferred to their respective hoists (108A, 108B) through connected shafts. If the hoists (108A, 108B) rotate in the clockwise direction, the line systems (110A, 110B) wind around their corresponding hoists (108A, 108B). If the hoists (108A, 108B) rotate in the anti-clockwise direction, the line systems (110A, 110B) unwind from their corresponding hoists (108A, 108B).

In one embodiment herein, the tension in the line systems (110A, 110B) causes the moving rails (104A, 104B) to move vertically along the supporting members 106 due to the engagement of the roller guides 118 of the supporting members 106 with the grooves 120 of the moving rails (104A, 104B), thereby raising the display unit 20 attached to the moving rails (104A, 104B) when the line systems (110A, 110B) are winding around their corresponding hoists (108A, 108B), and lowering the display unit 20 when the line systems (110A, 110B) are unwinding from their corresponding hoists (108A, 108B).

When the moving rails (104A, 104B) reach their predetermined upper or lower travel limits, they activate their corresponding deactivation units (128A, 128B). For example, when the moving rails (104A, 104B) reach the upper travel limit, the tab 132 on the lower supporting member 116B comes into contact with the lower deactivation unit 128B. And when the moving rails (104A, 104B) reach the lower travel limit, the tab 132 on the upper supporting member 116A comes into contact with the upper deactivation unit 128A. This physical interaction triggers an internal change within the corresponding deactivation unit (128A, 128B), which causes it to send an electrical signal to the control unit 112.

Then the control unit 112 immediately deactivates the driving units (122A, 122B), thereby preventing the display unit 20 from exceeding its safe operating range. This deactivation can involve cutting power to the driving units (122A, 122B) or activating the brake systems (124A, 124B) to halt the rotation of the driving units (122A, 122B). The display mounting system 100 prevents the hoists (108A, 108B) from continuing to wind or unwind the line systems (110A, 110B) by swiftly stopping the driving units (122A, 122B), thereby ultimately stopping the movement of the moving rails (104A, 104B) and the display unit 20 at a desired vertical position.

Figure 8:
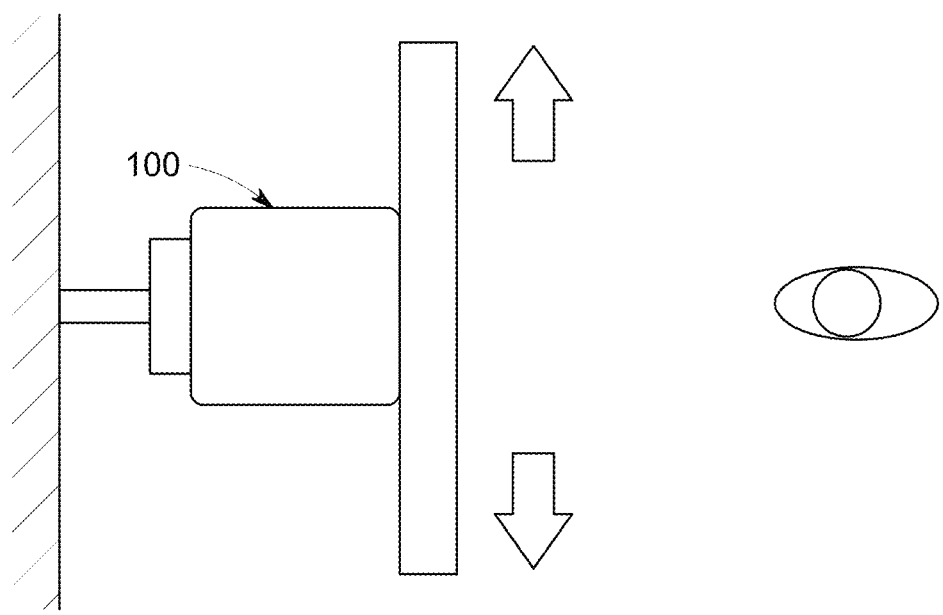
FIG. 8 illustrates a side perspective view of the display mounting system with the display unit installed on a wall surface, in accordance with embodiments of the invention.

FIG. 8 refers to a side perspective view of the display mounting system 100 with the display unit 20 installed on the wall surface. In one embodiment herein, the display mounting system 100 creates a visually clear and peaceful environment by hiding the mounting hardware from the user's perspective, thereby maintaining the minimalist aesthetic and clean lines. There is no chance of a visual conflict between the mounting hardware and the display unit's appearance because the display mounting system 100 is positioned behind the display unit 20 and may fit perfectly with any type of display unit design, regardless of color, material, or thickness. Because of the unobtrusive design of the display mounting system 100, the ambience of a room can be the main attraction. The display mounting system 100 fits in with the current decor without drawing attention to unwanted visual elements, whether the display mounting system 100 is in a modern office environment, a modern living room, or a comfortable home theater.

Figure 9:
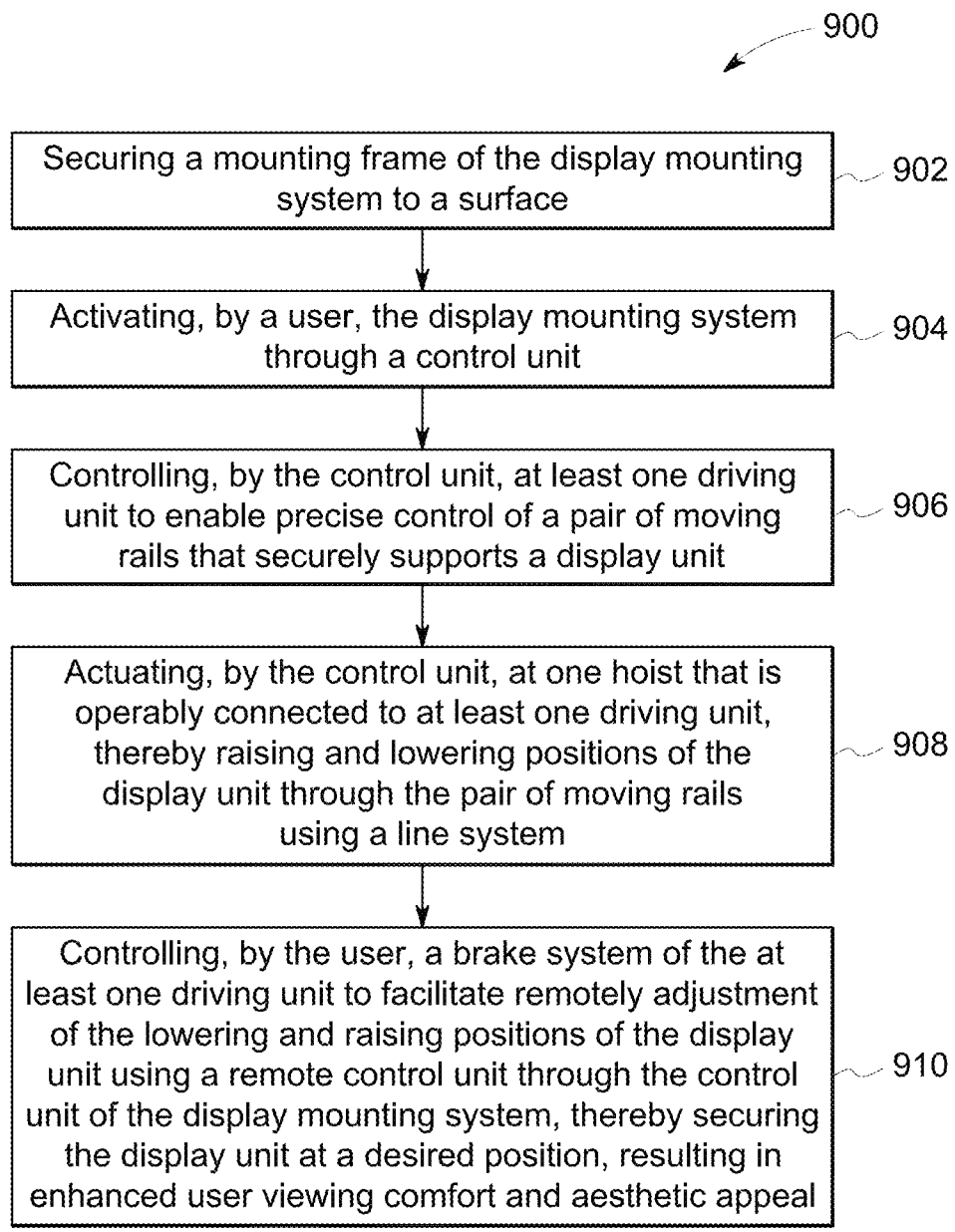
FIG. 9 illustrates a flowchart of a method of operating the display mounting system, in accordance with embodiments of the invention.

FIG. 9 refers to a flowchart 900 of a method of operating the display mounting system 100. First, at step 902, the mounting frame 102 of the display mounting system 100 is secured to the surface. At step 904, the user activates the display mounting system 100 through the control unit 112. At step 906, the control unit 112 controls the at least one driving unit (122A, 122B) to enable precise control of the pair of moving rails (104A, 104B) that securely supports the display unit 20. At step 908, the control unit 112 actuates the at one hoist (108A, 108B) that is operably connected to at least one driving unit (122A, 122B), thereby raising and lowering positions of the display unit 20 through the pair of moving rails (104A, 104B) using the line system.

Further, at step 910, the user controls the brake system (124A, 124B) of the at least one driving unit (122A, 122B) to facilitate remotely adjustment of the lowering and raising positions of the display unit 20 using the remote control unit through the control unit 112 of the display mounting system 100, thereby securing the display unit 20 at a desired position, resulting in enhanced user viewing comfort and aesthetic appeal.

In one embodiment herein, the display mounting system 100 comprises the driving units (122A, 122B), which utilizes the hoists (108A, 108B) with the line systems (110A, 110B) to raise and lower the display unit 20. In an exemplary embodiment, the driving units (122A, 122B) may directly connect to the rollers 118 of the supporting members 106, thereby eliminating the need for intermediary components such as the hoists (108A, 108B) and the line systems (110A, 110B). The driving unit (122A, 122B) may drive the rollers 118 of the supporting members 106 to rotate, which causes the moving rails (104A, 104B) with the attached display unit 20 to rise or descend along the supporting members 106.

In some exemplary embodiments, the display mounting system 100 could be integrated with smart home systems for voice-controlled adjustment or automatic adjustment of the display unit 20 based on user requirements. The display mounting system 100 may include additional safety features such as motion sensors for automatic adjustment of the display unit 20 based on users' hand gestures.

In one embodiment herein, the display mounting system 100 allows for smooth and controlled vertical adjustments of the display unit 20 with a simple press of a button or through a remote control unit. This user-friendly approach eliminates the need for manual manipulation or cumbersome tools. The adjustable nature of the display mounting system 100 enables the users to find the optimal viewing height for their specific needs, thereby improving ergonomic comfort and reducing neck strain. The incorporation of the deactivation units (128A, 128B) and the brake systems (124A, 124B) safeguards against potential accidents by automatically stopping the display unit 20 when it reaches its travel limits and by securing its position even in case of a power outage.

The display mounting system 100 allows valuable wall space compared to traditional fixed mounts and can be particularly beneficial in smaller rooms or areas where maximizing space is crucial. The display mounting system 100 is designed with robust components and incorporates safety features to ensure smooth operation and reliable performance over time. The display mounting system 100 avoids disrupting the clean lines and minimalist aesthetics often desired in modern living spaces by concealing the mounting hardware behind the display unit 20, thereby allowing the users to focus on the display unit 20.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A display mounting system for enhanced user viewing comfort and aesthetics, comprising:
    a mounting frame adapted to secure to a surface;
    a pair of moving rails movably support a display unit, wherein said pair of moving rails are configured to enable vertical movements of the display unit;
    a plurality of supporting members adapted to be mounted on the mounting frame, wherein said plurality of supporting members is configured to engage with the pair of moving rails through one or more rollers for facilitating smooth and uniform vertical motion of the display unit;
    at least one hoist operably connected to at least one driving unit, wherein the at least one hoist is configured to be rotated upon activation of the at least one driving unit to raise and lower the pair of moving rails through a line system, thereby lowering and raising positions of the display unit; and
    a control unit electrically connected to the at least one driving unit to enable precise control of the pair of moving rails, which allows for seamless adjustment of the lowering and raising positions of the display unit, resulting in enhanced user viewing comfort and aesthetic appeal.

2. The display mounting system of claim 1, wherein the display mounting system further comprises a brake system that is in communication with the control unit, and is configured to control the at least one driving unit, thereby facilitating adjustment of the lowering and raising positions of the display unit.

3. The display mounting system of claim 1, wherein the display mounting system further comprises a reducer operably connected between the at least one driving unit and the at least one hoist for adjusting speed and torque of the at least one driving unit.

4. The display mounting system of claim 1, wherein the display mounting system further comprises a deactivation unit that is in communication with the control unit, and is configured to deactivate the at least one driving unit when the pair of moving rails reaches its maximum raising and lowering positions.

5. The display mounting system of claim 4, wherein the deactivation unit comprises at least one of control switches and position sensors.

6. The display mounting system of claim 1, wherein the display mounting system further comprises a vertical guide tensioner operably connected to the line system for adjusting tension and ensuring smooth movement of the pair of moving rails.

7. The display mounting system of claim 1, wherein the control unit is configured to wirelessly communicate with a remote control unit via a network, thereby facilitating users to remotely control the display mounting system for adjusting positions of the display unit.

8. The display mounting system of claim 1, wherein the mounting frame, the pair of moving rails, and the plurality of supporting members are made of at least one of a material including high-strength steel, aluminum, and reinforced plastic.

9. The display mounting system of claim 1, wherein the at least one hoist comprises at least one of a winch, a pulley, and a cable drum.

10. A display mounting system for enhanced user viewing comfort and aesthetics, comprising:
- a mounting frame adapted to secure to a surface;
- a pair of moving rails movably support a display unit, wherein said pair of moving rails are configured to enable vertical movements of the display unit;
- a plurality of supporting members adapted to be mounted on the mounting frame, wherein said plurality of supporting members is configured to engage with the pair of moving rails through one or more rollers for facilitating smooth and uniform vertical motion of the display unit;
- at least one hoist operably connected to at least one driving unit, wherein the at least one hoist is configured to be rotated upon activation of the at least one driving unit; and
- a control unit electrically connected to the at least one driving unit, wherein said control unit comprises:
- a processor and a memory for storing one or more instructions executable by the processor, wherein the processor is configured to perform one or more operations include:
- activating, by a user, the display mounting system through the control unit;
- controlling, by the control unit, the at least one driving unit to enable precise control of the pair of moving rails that securely supports the display unit;
- actuating, by the control unit, the at one hoist, thereby raising and lowering positions of the display unit through the pair of moving rails using a line system;
- actuating, by the control unit, a deactivation unit to deactivate the at least one driving unit when the pair of moving rails reaches its maximum raising and lowering positions; and
- controlling, by the user, a brake system of the at least one driving unit to facilitate remotely adjustment of the lowering and raising positions of the display unit using a remote control unit through the control unit of the display mounting system, thereby securing the display unit at a desired position, resulting in enhanced user viewing comfort and aesthetic appeal.

11. The display mounting system of claim 10, wherein the remote control unit is configured to wireless communicate with the control unit via a network, wherein the remote control unit is adapted to facilitate users to remotely control the display mounting system for adjusting the raising and lowering positions of the display unit.

12. The display mounting system of claim 10, wherein the display mounting system further comprises a reducer operably connected between the at least one driving unit and the at least one hoist for adjusting speed and torque of the at least one driving unit.

13. The display mounting system of claim 10, wherein the deactivation unit comprises at least one of control switches and position sensors.

14. The display mounting system of claim 10, wherein the display mounting system further comprises a vertical guide tensioner that is operably connected to the line system for adjusting tension and ensuring smooth movement of the pair of moving rails.

15. The display mounting system of claim 10, wherein the mounting frame, the pair of moving rails, and the plurality of supporting members are made of at least one of a material including high-strength steel, aluminum, and reinforced plastic.

16. The display mounting system of claim 10, wherein the at least one hoist comprises at least one of a winch, a pulley, and a cable drum.

17. A method of operating a display mounting system, comprising:
- securing a mounting frame of the display mounting system to a surface;
- activating, by a user, the display mounting system through a control unit;
- controlling, by the control unit, at least one driving unit to enable precise control of a pair of moving rails that securely supports a display unit;
- actuating, by the control unit, at one hoist that is operably connected to at least one driving unit, thereby raising and lowering positions of the display unit through the pair of moving rails using a line system; and
- controlling, by the user, a brake system of the at least one driving unit to facilitate remotely adjustment of the lowering and raising positions of the display unit using a remote control unit through the control unit of the display mounting system, thereby securing the display unit at a desired position, resulting in enhanced user viewing comfort and aesthetic appeal.

18. The method of claim 17, wherein the remote control unit is configured to wireless communicate with the control unit via a network, wherein the remote control unit is adapted to facilitate users to remotely control the display mounting system for adjusting the raising and lowering positions of the display unit.

19. The method of claim 17, wherein the display mounting system further comprises a reducer operably connected between the at least one driving unit and the at least one hoist for adjusting speed and torque of the at least one driving unit.

20. The method of claim 17, wherein the display mounting system further comprises a deactivation unit that is in communication with the control unit, and is configured to deactivate the at least one driving unit when the pair of moving rails reaches its maximum raising and lowering positions, wherein the deactivation unit comprises at least one of control switches and position sensors.

* * * * *